(12) United States Patent
Stockwell et al.

(10) Patent No.: US 7,074,029 B2
(45) Date of Patent: Jul. 11, 2006

(54) ACCUMULATION, CONTROL AND ACCOUNTING OF FLUID BY-PRODUCT FROM A SOLID DEPOSITION MODELING PROCESS

(75) Inventors: John S. Stockwell, Sylmar, CA (US); Raymond J. Bishop, Santa Clarita, CA (US); Raymond Mathew Soliz, Chatsworth, CA (US); Jon Jody Fong, Calabasas, CA (US)

(73) Assignee: 3D Systems, Inc., Valencia, CA (US)

( * ) Notice: Subject to any disclaimer, the term of this patent is extended or adjusted under 35 U.S.C. 154(b) by 378 days.

(21) Appl. No.: 10/625,745

(22) Filed: Jul. 23, 2003

(65) Prior Publication Data

US 2005/0017393 A1    Jan. 27, 2005

(51) Int. Cl.
*B28B 17/00*    (2006.01)

(52) U.S. Cl. .................... 425/174.4; 425/215; 425/375; 264/308

(58) Field of Classification Search ............. 425/174.4, 425/215, 375; 264/308
See application file for complete search history.

(56) References Cited

U.S. PATENT DOCUMENTS

| | | | | |
|---|---|---|---|---|
| 5,204,055 A * | 4/1993 | Sachs et al. .................... 419/2 |
| 5,555,176 A | 9/1996 | Menhennett et al. |
| 5,585,119 A * | 12/1996 | Petersen et al. .............. 425/4 C |
| 5,945,058 A * | 8/1999 | Manners et al. ............. 264/401 |
| 5,965,079 A * | 10/1999 | Manners ....................... 264/401 |
| 6,193,923 B1 | 2/2001 | Leyden et al. |
| 6,270,335 B1 | 8/2001 | Leyden et al. |
| 6,416,850 B1 * | 7/2002 | Bredt et al. ............... 428/297.4 |
| 6,492,651 B1 | 12/2002 | Kerekes |
| 6,562,269 B1 | 5/2003 | Fong |
| 6,841,116 B1 * | 1/2005 | Schmidt ...................... 264/401 |
| 6,896,839 B1 * | 5/2005 | Kubo et al. .................. 264/460 |
| 2005/0112226 A1 * | 5/2005 | Kamite et al. .............. 425/145 |
| 2005/0116391 A1 * | 6/2005 | Lindemann et al. ........ 264/497 |

OTHER PUBLICATIONS

Filed Oct. 3, 2001, U.S. Appl. No. 09/970,956; "Quantized Feed System For Solid FreeForm Fabrication", Inventors: Varnon et al.
Filed Oct. 3, 2001, U.S. Appl. No. 09/971,247; "Ultra-Violet Light Curable Hot Melt Composition", Inventors: Schmidt et al.
Filed Oct. 3, 2001, U.S. Appl. No. 09/971,337; "Selective Deposition Modeling With Curable Phase Change Materials", Inventor: Kris Alan Schmidt.

* cited by examiner

*Primary Examiner*—Robert Davis
*Assistant Examiner*—G. Nagesh Rao
(74) *Attorney, Agent, or Firm*—Ralph D'Alessandro; William A. Simons

(57) ABSTRACT

A by-product waste material removal system for solid deposition modeling. As excess build and support material is removed during the build as a by-product waste the removal system accumulates, measures, and releases the by-product waste material into a waste receptacle for disposal. The by-product waste material removal system requires no mechanical vacuum systems and allows operator intervention to remove and replace waste receptacles without interrupting an ongoing build.

18 Claims, 5 Drawing Sheets

ACCUMULATION, CONTROL AND ACCOUNTING OF FLUID BY-PRODUCT FROM A SOLID DEPOSITION MODELING PROCESS

BACKGROUND OF THE INVENTION

1. Field of the Invention

The invention relates in general to a system and a method for accurately metering, accumulating, and accounting for the by-product waste stream generated from a solid deposition modeling process. In addition, the system allows operator intervention during the fabrication process and can be integrated with a sealed waste removal system wherein reactive materials can be employed without special handling procedures.

2. Description of the Prior Art

Recently, several new technologies have been developed for the rapid creation of models, prototypes, and parts for limited run manufacturing. These new technologies can generally be described as solid freeform fabrication, herein referred to as "SFF". Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. In SFF, complex parts are produced from a modeling material in an additive fashion as opposed to conventional fabrication techniques, which are generally subtractive in nature. For example, in conventional fabrication techniques material is removed by machining operations or shaped in a die or mold to near net shape and then trimmed. In contrast, additive fabrication techniques incrementally add portions of a build material to targeted locations, typically layer by layer, in order to build a complex part.

SFF technologies typically utilize a computer graphic representation of a part and a supply of a build material to fabricate the part in successive layers. SFF technologies have many advantages over the prior conventional manufacturing methods. For instance, SFF technologies dramatically shorten the time to develop prototype parts and can quickly produce limited numbers of parts in rapid manufacturing processes. They also eliminate the need for complex tooling and machining associated with the prior conventional manufacturing methods, particularly when creating molds for casting operations. In addition, SFF technologies are advantageous because customized objects can be produced quickly by processing computer graphic data.

There are a wide variety of build materials that are used in various SFF techniques. These materials are typically applied in the form of a powder, liquid, gas, paste, foam, or gel. Recently, there has developed an interest in utilizing highly viscous paste materials in SFF processes to achieve greater mechanical properties. In addition, an interest has recently developed in reproducing visual features such as color on the three-dimensional objects produced by SFF processes. This has produced a need to develop special additives for the build materials along with new dispensing systems to enable the production of these visual features when building the three-dimensional objects.

One category of SFF that has emerged is selective deposition modeling, herein referred to as "SDM". In SDM, a build material is physically deposited in a layerwise fashion while in a flowable state and is allowed to solidify to form an object. In one type of SDM technology the modeling material is extruded as a continuous filament through a resistively heated nozzle. In yet another type of SDM technology the modeling material is jetted or dropped in discrete droplets in order to build up a part. In one particular SDM apparatus, a thermoplastic material having a low-melting point is used as the solid modeling material, which is delivered through a jetting system such as those used in ink jet printers. One type of SDM process utilizing ink jet print heads is described, for example, in U.S. Pat. No. 5,555,176 to Menhenneft, et al.

Because ink jet print heads are designed for use in two-dimensional printing, special modifications must be made in order to use them in building three-dimensional objects by SFF techniques. This is generally because there are substantial differences between the two processes, thus requiring different solutions to different problems. For example, in two-dimensional printing a relatively small amount of an ink is jetted and allowed to dry or solidify with a significant interest being given to print resolution. Because only a small amount of material is jetted in two-dimensional printing, the material reservoir for the liquid material can reside directly in the ink jet print head while providing the ability to print numerous pages before needing to be refilled or replaced. In contrast, in SDM utilizing an ink jet printhead, a large amount of normally solid material, such as a thermoplastic or wax material, must be heated to a flowable state, jetted, and then allowed to solidify. Furthermore, in SDM dispensing resolution is not as critical as it is in two-dimensional printing. This is generally because, for each targeted pixel location, the amount of material to be jetted in SDM techniques is substantially greater than the amount to be jetted in two-dimensional printing techniques. For example, it may be required to deposit six droplets on a particular pixel location in SDM compared to just one or two droplets in two-dimensional printing. Although the targeting accuracy may be the same, the actual resolution achieved in SDM techniques is generally somewhat less than in two-dimensional printing because the six droplets dispensed may droop or slide towards adjacent pixel locations.

The differences mentioned above are significant and create a number of problems to be resolved. For instance, the amount of material deposited in ink jet based SDM techniques, both in volume and in mass, can be so substantial that it is generally considered impractical to mount a reservoir directly on the ink jet print head to hold all of the material. Thus, it is typical in most SDM systems to provide a large reservoir at a location remote from the print head that is in communication with the ink print head via a material delivery system having a flexible umbilical tube. However, the large container and umbilical tube must be heated to cause at least some of the build material to become or remain flowable so that the material can flow to the dispensing device. Start up times are longer for SDM techniques using ink jet print heads than in two-dimensional printing with ink jet print heads due to the length of time necessary to initially heat the solidified material in the large remote reservoir to its flowable state. In addition, a significant amount of energy is required to maintain the large quantity of material in the flowable state in the reservoir and in the delivery system during the build process. This generates a significant amount of heat in the build environment.

Another problem that is unique to SDM techniques is that the layers being formed must be shaped or smoothed during the build process to establish a uniform layer thickness. Normalizing the layers is commonly accomplished with a planarizer that removes a portion of the material dispensed in the layers. One such planarizer is disclosed in U.S. Pat. No. 6,270,335 to Leyden et al. However, the planarizer produces waste material during the build process that must be handled. This is less of a concern when working with non-reactive materials; however, it is a greater concern when reactive materials are used. For example, most photopolymers are reactive, and excessive contact to human skin may result in sensitivity reactions. Thus, most SFF processes that utilize photopolymer materials require some additional handling procedures in order to minimize or eliminate excessive physical contact with the materials. For example, in stereolithography, operators typically wear gloves when handling the liquid resin and when removing finished parts from the build platform. However, SDM operators who normally handle even non-reactive materials consider additional handling procedures inconvenient and, if possible, would prefer they be eliminated. For reactive materials in SDM systems the issue is compounded and rises above mere inconvenience. Thus, there is a need to provide a material feed and waste system for SDM that can handle reactive materials without requiring the implementation of special handling procedures.

A by-product waste handling system for dealing with the aforementioned waste stream from an SDM process is described in U.S. patent application Ser. No. 09/970,956, entitled "Quantized Feed System For Solid FreeForm Fabrication" and assigned to the assignee of the present invention. In that system the by-product waste material collects in an in-line reservoir and flows from it by gravity for delivery through actuated solenoid valves into waste receptacles. Although workable, that system is improved significantly by the instant invention. A lack of sufficient buffering capacity can result in too much by-product waste material backing up in the system. The amount of by-product waste is not known so the amount of energy (optical or thermal) needed to cure or solidify the material collected is not known. A system is needed that reliably captures all of the waste material, accurately measures it, and delivers measured amounts to a waste collection container without the use of large and expensive vacuum systems. In addition, a system is needed that allows operator intervention to remove and replace waste containers without interrupting a build.

These and other difficulties of the prior art are overcome according to the present invention by providing a new and simpler by-product waste removal system for a solid deposition modeling system utilizing on an automated collection reservoir.

BRIEF SUMMARY OF THE INVENTION

The instant invention provides its benefits across any SFF process that requires removal of excess build and/or support material during a build. This is done by providing a reliable and precise system for accumulating, accounting for, and removing by-product waste material from a SFF device for forming three-dimensional objects.

It is one aspect of the instant invention to provide an improved by-product waste removal system for SFF systems that overcomes the earlier mentioned disadvantages of prior art systems.

It is another aspect of the instant invention to provide an improved by-product waste removal system for SFF systems that does not require a mechanical vacuum pumping system.

It is another aspect of the instant invention to provide an improved by-product waste removal system that allows intervention in removing collected waste during the SFF build process without interrupting the build.

It is still another aspect of the instant invention to provide an improved by-product waste removal system that can accurately account for by-product waste removed.

It is a feature of the present invention that at least one container holding a discrete amount of material is delivered to a queue station and the material is removed from the container for delivery to the dispensing device.

It is an advantage that the by-product waste removal system of the present invention is lower in cost, simpler and more effective than prior by-product waste removal systems.

These and other aspects, features and advantages are provided by a method for delivering at least one material and removing waste material in a solid freeform fabrication apparatus to form a three-dimensional object, the method including at least the steps of: delivering material to a dispensing device; dispensing the removed material from the dispensing device in a layerwise fashion to form the three-dimensional object; producing waste material from the dispensed material and depositing the waste material in a waste receptacle, wherein the depositing step includes at least collecting the waste material in an intermediate vessel, then releasing from the intermediate vessel to the waste receptacle the collected waste material when a pre-set amount of the waste material has been collected and then repeating the collecting and releasing steps until a three-dimensional object is formed.

The invention also includes a material feed and waste system for a solid freeform fabrication apparatus, the system including at least a means for delivering at least one material to at least one dispensing device; a means for dispensing the discrete amount of material by the dispensing device in a layerwise fashion to form via a plurality of layers a three-dimensional object; a means for normalizing the layers of the three-dimensional object wherein waste material is produced; means for depositing the waste material in a waste receptacle; wherein the means for depositing the waste material comprises: means for collecting the waste material in an intermediate vessel and a means for releasing from the intermediate vessel to the waste receptacle the collected waste material when a pre-set amount of the waste material has been collected; and a means for repeating said collecting and releasing means until three-dimensional object is formed.

These and other aspects, features, and advantages are achieved according to the method and apparatus of the present invention that employs a unique waste by-product removal system that automatically and reliably transfers measured amounts of by-product waste material to a final collection container.

BRIEF DESCRIPTION OF THE DRAWINGS

These and other aspects, features and advantages of the present invention method and apparatus will become apparent upon consideration of the following detailed disclosure of the invention, especially when it is taken in conjunction with the accompanying drawings wherein.

DETAILED DESCRIPTION OF THE PREFERRED EMBODIMENTS

Figure 1:
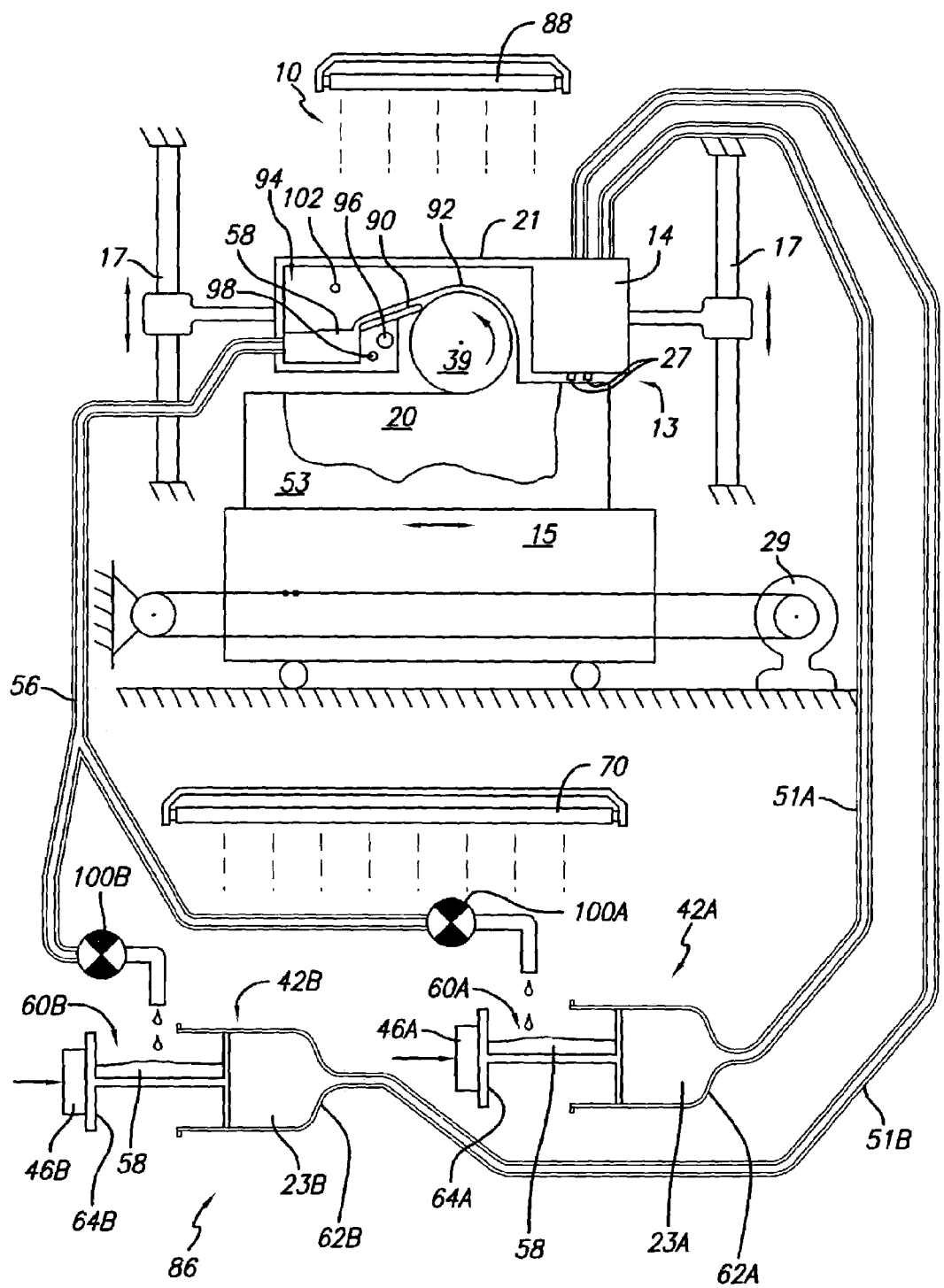
FIG. 1 is a schematic view of a prior art SDM apparatus and the by-product waste removal scheme.

The present invention provides its benefits across a broad spectrum of SFF processes. While the description which follows hereinafter is meant to be representative of a number of such applications, it is not exhaustive. As will be understood, the basic apparatus and methods taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

While the present invention can be applicable to other SFF techniques and objects made therefrom, the invention will be described with respect to solid deposition modeling (SDM) utilizing a build material dispensed in a flowable state. However it is to be appreciated that the present invention can be implemented with any SFF technique that requires the continuous or intermittent removal of by-product waste during a build. For example, the build material can be a photocurable or sinterable liquid or powder material that is heated to a flowable state but when solidified may form a high viscosity liquid, a semi-solid, a gel, a paste, or a solid. In addition, the build material may be a composite mixture of components, such as a mixture of photocurable liquid resin and powder material such as metallic, ceramic, or mineral, if desired.

As used herein, the term "a flowable state" of a build material is a state wherein the material is unable to resist shear stresses that are induced by a dispensing device, such as those induced by an ink jet print head when dispensing the material, causing the material to move or flow. Preferably the flowable state of the build material is a liquid state, however the flowable state of the build material may also exhibit thixotropic properties. The term "solidified" and "solidifiable" as used herein refer to the phase change characteristics of a material where the material transitions from the flowable state to a non-flowable state. A "non-flowable state" of a build material, as used herein, is a state wherein the material is sufficiently self-supportive under its own weight so as to hold its own shape. Build materials existing in a solid state, a gel state, a paste state, or a thixotropic state are examples of a non-flowable state of a build material for the purposes of discussion herein. Further, the term "cured" or "curable" refers to any polymerization reaction. Preferably the polymerization reaction is triggered by exposure to radiation or thermal energy.

Most preferably the polymerization reaction involves the cross-linking of monomers and oligomers initiated by exposure to actinic radiation in the ultraviolet or infrared wavelength band. Further, the term "cured state" refers to a material, or portion of a material, in which the polymerization reaction has substantially completed. It is to be appreciated that as a general matter the material can easily transition between the flowable and non-flowable state prior to being cured. However, once cured, the material cannot transition back to a flowable state and be dispensed by the apparatus.

Additionally, the term "support material" refers to any material that is intended to be dispensed to form a support structure for the three-dimensional objects as they are being formed, and the term "build material" refers to any material that is intended to be dispensed to form the three-dimensional objects. The build material and the support material may be similar materials having similar formulations but, for purposes herein, they are to be distinguished only by their intended use.

A preferred method for dispensing a curable phase change material to form a three-dimensional object and for dispensing a non-curable phase change material to form supports for the object is disclosed in the co-pending U.S. patent application Ser. No. 09/971,337 entitled "Selective Deposition Modeling with Curable Phase Change Materials", assigned to the assignee of the present invention. A preferred curable phase change material and non-curable phase change support material are disclosed in the co-pending U.S. patent application Ser. No. 09/971,247 entitled "Ultra-Violet Light Curable Hot Melt Composition", also assigned to the assignee of the present invention. An SDM system and method using powder is disclosed in U.S. Pat. No. 6,416,850 and a method of using an ink jet printhead to deliver a binder to layers of powdered material is described in U.S. Pat. No. 5,204,055.

Referring particularly to FIG. 1 there is illustrated generally by the numeral 10 a prior art solid freeform fabrication apparatus of the SDM type that can be adapted to incorporate the waste removal system of the instant invention. This apparatus 10 is schematically shown including a material feed and waste system indicated generally by the numeral 86. The build platform 15 is reciprocally driven by conventional drive means 29. The dispensing trolley 21 is precisely moved by actuation means 17 vertically to control the thickness of the layers of the object 20. The actuation means 17 comprises precision lead screw linear actuators driven by servomotors. The ends of the linear actuators 17 reside on opposite ends of the build environment 13 and in a transverse direction to the direction of reciprocation of the build platform. However, for ease of illustration in FIG. 1 they are shown in a two-dimensionally flat manner giving the appearance that the linear actuators are aligned in the direction of reciprocation of the build platform 15. Although they may be aligned with the direction of reciprocation, it is sometimes preferred they be situated in a transverse direction so as to optimize the use of space within the apparatus.

In the build environment illustrated generally by numeral 13 in FIG. 1, there is shown by numeral 20 a three-dimensional object being formed with integrally formed supports 53. The object 20 and supports 53 both reside in a sufficiently fixed manner on the build platform 15 so as to sustain the acceleration and deceleration effects during reciprocation of the build platform 15 while still being removable from the platform. In order to achieve this, it is desirable to dispense at least one complete layer of support material on the build platform 15 before dispensing the build material since the support material is designed to be removed at the end of the build process. In this embodiment, the build material identified by numeral 23A is dispensed by the dispensing device 14 that is in fluid flow communication with the material feed portion of system 86 to form the three-dimensional object 20. The support material, identified by numeral 23B, is dispensed in the same manner by dispensing device 14 to form the supports 53. Containers identified generally by numerals 42A and 42B, respectively hold a discrete amount of these two materials 23A and 23B. Umbilicals 51A and 51B, respectively deliver the material to dispensing device 14, which in the preferred embodiment is an ink jet print head having a plurality of dispensing orifices 27.

Preferably the materials 23A and 23B of FIG. 1 are phase change materials that are heated to a liquid state, and heaters (not shown) are provided on the umbilicals 51A and 51B to maintain the materials in a flowable state as they are delivered to the dispensing device 14. In this embodiment the ink jet print head 14 is configured to dispense both materials from a plurality of dispensing orifices 27 so that both materials can be selectively dispensed in a layerwise fashion to any location in any layer being formed. When the dispensing device 14 needs additional material 23A or 23B, extrusion bars 46A and 46B, respectively are engaged to extrude the material from the containers 42A and 42B, through the umbilicals 51A and 52B, and to discharge orifices 27 of the dispensing device 14.

The dispensing trolley 21 in the embodiment shown in FIG. 1 includes a heated planarizer 39 that removes excess material 23A and 23B from the layers being dispensed to normalize the dispensed layers. The heated planarizer 39 contacts the build and support materials 23A and 23B in their non-flowable state and, because it is heated, locally transforms some of the materials to a flowable state. Due to the forces of surface tension, the excess flowable materials 23A and 23B adhere to the surface of the planarizer 39, and as the planarizer 39 rotates the adhered materials are brought up to the skive 90 which is in contact with the planarizer 39. The skive 90 separates the excess materials 23A and 23B that are now waste material from the surface of the planarizer 39 and directs the flowable material into a waste reservoir, identified generally by numeral 94 located on the trolley 21. A heater 96 and thermistor 98 on the waste reservoir 94 operate to maintain the temperature of the waste reservoir at a sufficient level so that the Waste material 58 in reservoir 94 remains in a flowable state.

Waste reservoir 94 is connected to a heated waste umbilical tube 56 for delivery of the Waste material 58 to the waste receptacles 60A and 60B. Waste material 58 is allowed to flow via gravity down to the waste receptacles 60A and 60B. Although only one umbilical tube or line 56 with a splice connection to each waste receptacle is shown, it is preferred to provide a separate waste umbilical line 56 between the waste reservoir 94 and each waste receptacle 60A and 60B.

For each waste receptacle 60A and 60B, there is associated a solenoid valve 100A and 100B, for regulating the delivery of waste material to the waste receptacles. Preferably the valves 100A and 10B remain closed, and only open when the respective extrusion bars 46A and 46B are energized to remove additional material. For example, if only extrusion bar 46A is energized, only valve 100A is opened to allow waste material 58 to be dispensed into the waste receptacle 60A. This feedback control of the valves prevent delivery of too much waste material to either waste receptacle by equalizing the delivery of waste material in the waste receptacles in proportion to the rate at which material 23A and 23B is fed from the containers 42A and 42B to the dispensing device 14. Thus, the delivery of waste material 58 to the waste receptacles 60A and 60B is balanced with the feed rates of build material 23A and support material 23B of the feed system.

In the prior art system of FIG. 1, an additional detection system is provided in the waste system to prevent the waste material 58 from overflowing the waste reservoir 94. The system comprises an optic sensor 102 provided in the waste reservoir 94 that detects an excess level of waste material 58 in the reservoir 94. If the level of the waste material 58 in the waste reservoir 94 raises above a set level, it is detected by the sensor 102. The sensor 102 in turn provides a signal to a computer controller (not shown), which shuts down the apparatus. This prevents waste material from flooding the components inside the apparatus 10 in the event of a malfunction of the feed and waste system 86. The apparatus 10 can then be serviced to correct the malfunction, thus preventing excessive damage to the apparatus.

In the prior art system shown in FIG. 1, the build material 23A is a phase change material that is cured by exposure to actinic radiation. After the curable phase change material 23A is dispensed in a layer it transitions from the flowable state to a non-flowable state. After a layer has been normalized by the passage of the planarizer 39 over the layer, the layer is then exposed to actinic radiation by radiation source 88 to cure the build material 23A. Preferably the actinic radiation is in the ultraviolet or infrared band of the spectrum. It is important, however, that planarizing occurs prior to exposing a layer to the radiation source 88. This is because the preferred planarizer car only normalize the layers if the material in the layers can be changed from the non-flowable to the flowable state. This cannot occur if the material 23A is first cured.

In conjunction with the curable build material 23A, a non-curable phase change material is used for the support material 23B. Since the support material 23B cannot be cured, it can be removed from the object and build platform, for example, by being dissolved in a solvent. Alternatively the support material 23B can be removed by application of heat to return the material to a flowable state, if desired.

In this prior art system the by-product waste material 58 comprises both materials 23A and 23B as they accumulate during planarizing. Preferably, a second radiation source 70 is provided to expose the waste material in the waste receptacles to radiation to cause the material 23A to cure so that there is no reactive material in the waste receptacles.

This prior art system has containers 42A and 42B for use in the by-product feed and waste system 86. Each container 42A and 42B comprises a syringe portion 62A and 62B and plunger portion 64A and 64B. The syringe portion forms a cylinder having a small opening at one end for dispensing the material 23A or 23B, as appropriate. As the plunger portion 64A and 64B is driven into the syringe portion 62A and 62B, the material 23A or 23B in the syringe portion of the corresponding container is expelled through the small opening.

Unique to each container is a waste receptacle 60A and 60B that is provided on the plunger portion 64 for accepting delivery of waste material 58. There is a corresponding waste receptacle 60A or 60B for each plunger portion 64A and 64B. The appropriate extrusion bar 46A or 46B acts on the plunger portion 64A and 64B to drive the plunger into the syringe portion 62A and 62B and thereby remove the build material 23A and support material 23B from the appropriate container 42A and 42B. As this occurs, the waste material 58 is deposited into the waste receptacles 60A and 60B of the plunger portions 64A and 64B. Once substantially all of the build and support materials 23A and 23B have been delivered from their containers 42A and 42B to the dispensing device 14, the waste material 58 is sealed within the depleted containers for safe disposal.

Figure 2:
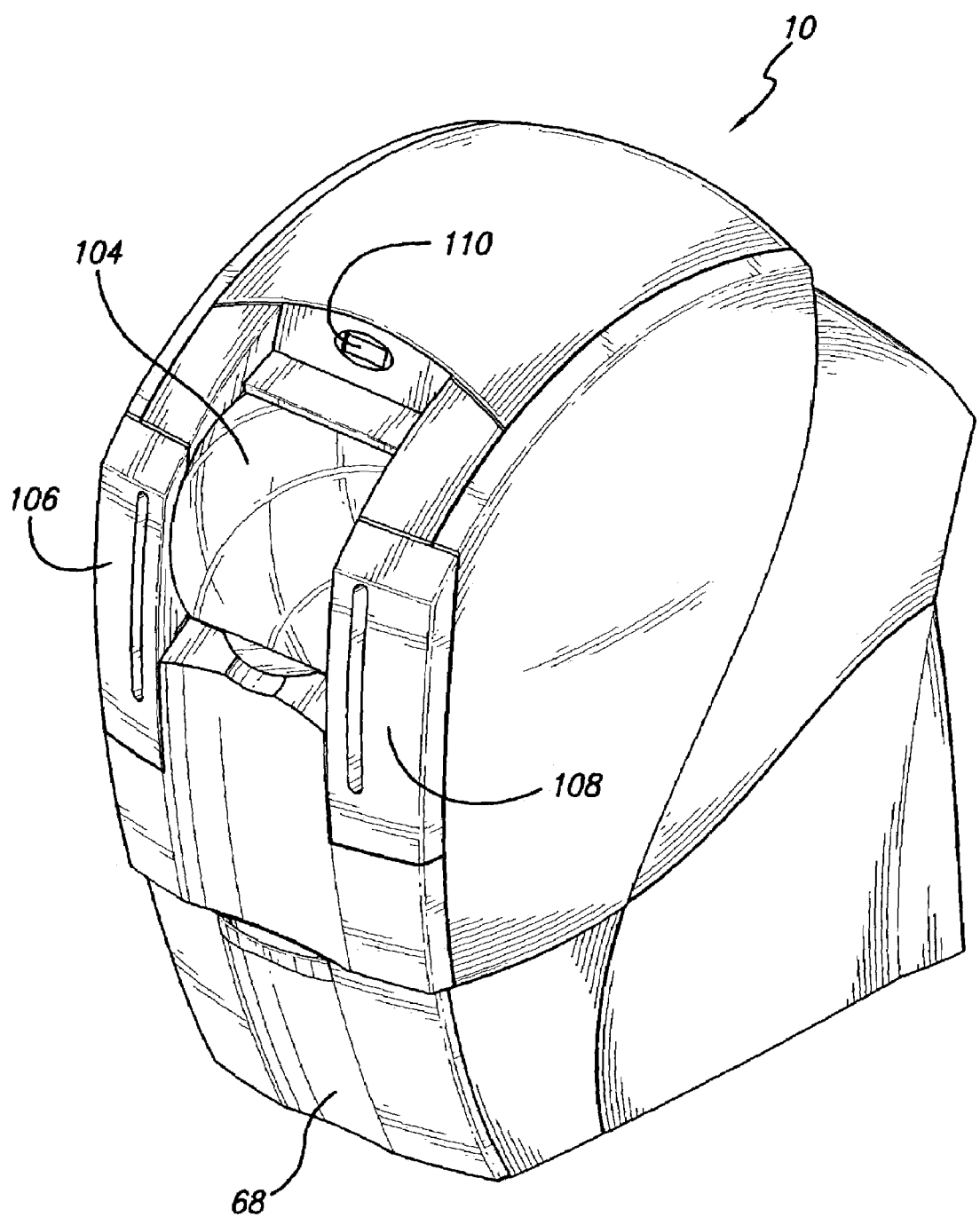
FIG. 2 is a perspective view of a SDM apparatus of the embodiment shown schematically in FIG. 1.

Now referring to FIG. 2, the SDM apparatus schematically shown in FIG. 1 is shown as 10. To access the build environment, a slideable or retractable door 104 is provided at the front of the apparatus. The door 104 does not allow radiation within the machine to escape into the outside environment. The apparatus is configured such that it will not operate or turn on with the door 104 open. In addition, when the apparatus 10 is in operation the door 104 will not open. A support material feed door 106 is provided so that the support material containers (not shown) can be inserted into the apparatus 10. A build material feed door 108 is also provided so that the build material containers (not shown) can be inserted into the apparatus. A waste drawer 68 is provided at the bottom end of the apparatus 10 so that expelled waste containers can be removed from the apparatus 10. A user interface 110 is provided which is in communication with an internal computer (also not shown), which tracks receipt of the print command data from an external computer. That typically is the user's workstation computer or a computer network.

Figure 3:
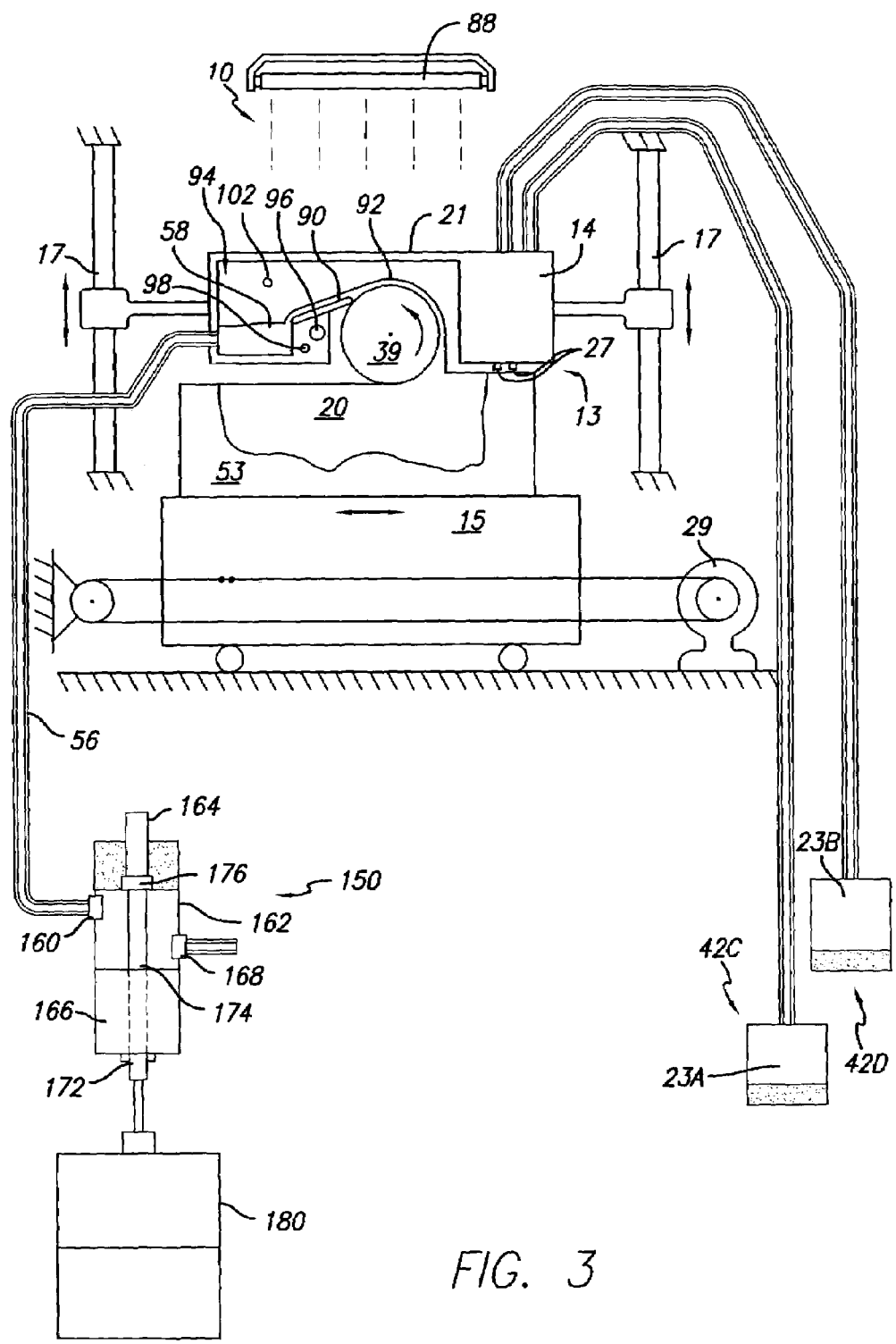
FIG. 3 is a schematic view of a preferred embodiment the by-product waste removal scheme of the instant invention.

Turning to FIG. 3, a schematic of a similar SDM device is shown but with the by-product waste removal system 86 replaced by the by-product removal system of the present invention. In this design the build and support material feed containers shown earlier as 42A and 42B in FIG. 1 have been replaced by simpler container systems 42C and 42D that do not require the feature of storing waste material in the used feed containers.

In FIG. 3 the complete build apparatus of the SDM device operates as described in FIG. 1 in building parts. Therefore that aspect of the description of the method and apparatus will not be repeated here, but it will be understood to be the same as the description given with respect to FIG. 1. In addition the schematic shown in FIG. 3 operates within the same industrial design shown in the perspective view of FIG. 2.

Beginning with the waste umbilical tube or line 56 in FIG. 3, the by-product waste material removal system of the instant invention is shown generally by the numeral 150 and will be described hereafter as accumulator 150. By-product waste material 58 from the waste reservoir 94 flows by gravity through line 56 and into intermediate vessel or holding tank 162 of accumulator 150 through inlet line 160. Vessel 162 is a tank that has sealable openings at the base or bottom and the top with o-ring seals that open and close when actuator 164 moves a central rod 174 up or down. When rod 174 is moved to the up position, top vent 176 is opened to the atmosphere and base drain 172 is sealed to allow vessel 162 of accumulator 150 to fill with by-product waste. A level detector 168 senses when the level of by-product waste material 166 rises to the level detector. Level detector 168 then activates actuator 164 to move central rod 174 down, closing top vent 176 and opening base drain 172. When drain 172 opens the by-product waste material 58 rapidly empties through drain 172 by gravity flow into waste material receptacle 180. Because top vent 176 is closed at this time the flow of liquid waste creates a slight negative pressure, effectively pulling any residual by-product waste material 58 from line 56. Earlier work with systems of this type required bulky and expensive vacuum pump systems to ensure that line 56 would remain clear and not plug during SDM builds. In this instant invention that function is performed by the slight vacuum created by the gravity flow of the by-product waste from vessel 162 of accumulator 150.

After vessel 162 empties actuator 164 is activated to move central rod 174 up, closing the bottom seal 172 and opening top vent 176 to vent to the atmosphere to thereby allow vessel 162 to begin refilling for the next cycle.

Because level detector 168 always activates actuator 164 at the same level accumulator 150 can easily be calibrated so that the system computer can monitor the exact amount of by-product waste material fed into waste material receptacle 180.

It should be recognized that the preferred design described herein of a central shaft that activates the vent and drain seals could be replaced by any appropriate design that opens and closes the seals in the same manner, such as spring loaded valves or solenoid controlled valves.

Waste material receptacle 180, in a preferred embodiment, is a disposable polypropylene bag with a zipper closure that can be easily removed for disposal. It should be recognized that the use of a polypropylene bag is only one embodiment and that other bags or bottles may be employed in the instant invention. Because of the capacity of accumulator 150 and its vessel 162, the design of the instant invention allows the operator to intervene to remove and replace waste receptacle 180 without interrupting the SDM build.

In another embodiment (not shown) a source of actinic radiation could be mounted near waste receptacle 180 to cure the by-product waste material in waste receptacle 180.

Figure 4:
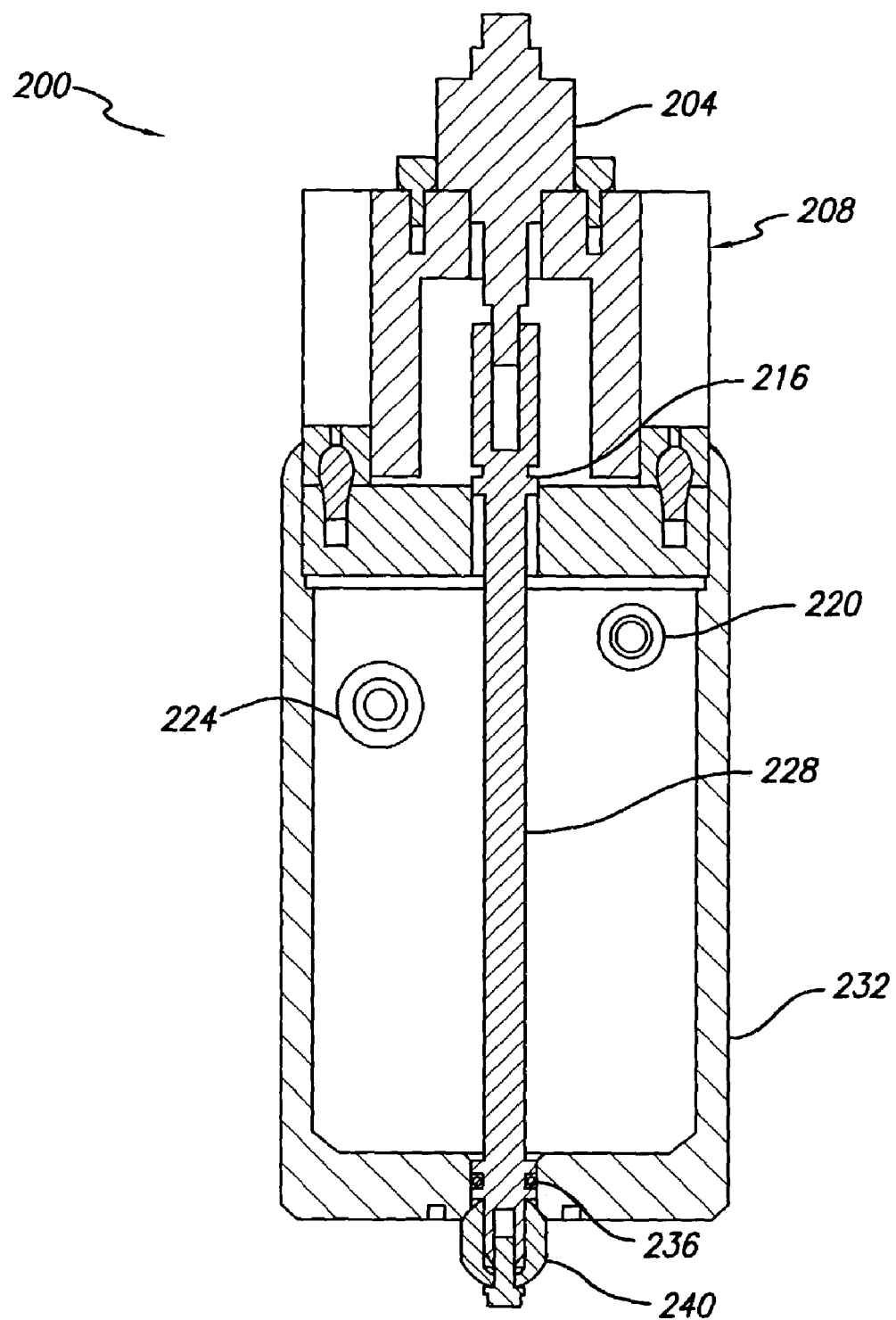
FIG. 4 is a schematic sectional view of a preferred embodiment of the accumulator of the by-product waste removal apparatus of the instant invention.

Turning to FIG. 4, a schematic side sectional view of the accumulator 150 of FIG. 3 is illustrated generally by the numeral 200. The schematic shows a metal accumulator tank 232 with a metal rod 228 passing completely through tank 232 and connected to actuator 204, which is mounted to the top of accumulator tank 232 by actuator support frame 208. An inlet hole 220 in accumulator tank 232 is the entry point for by-product waste material 58 (not shown) from the SDM device. Hole 224 in accumulator tank 232 is the entry point for a level detector that is preferably a reflective object optical IR sensor adapted to sense liquid. The unadapted sensor is available commercially from Optek Technology, Inc. of Carrollton, Tex. 75006. Adaptations include a glass cone-shaped reflector lens and an insulating housing. An o-ring seal 216 is located at top of accumulator tank 232 around central rod 228 and acts to seal the top of accumulator tank 232 when actuator 204 is activated into down position. A second o-ring seal 236 and a ball seal 240 are located at bottom of accumulator tank 232 around central rod 228 and act to seal the bottom drain hole of accumulator tank 232 when the actuator 204 is activated into up position.

Figure 5:
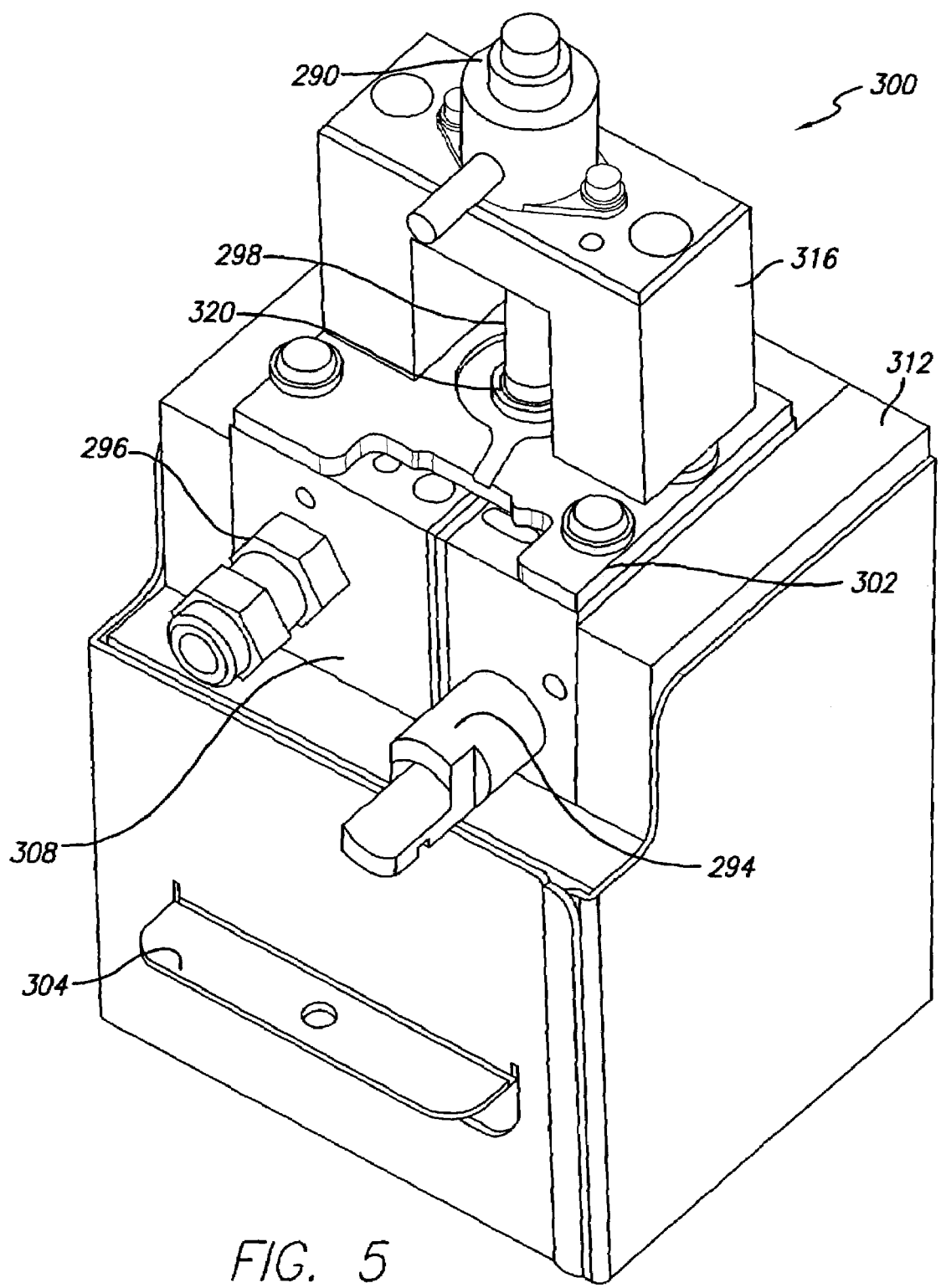
FIG. 5 is a perspective view of the preferred embodiment of the accumulator of the by-product-waste removal apparatus of the instant invention.

FIG. 5 is a perspective rendering showing a preferred design of the accumulator tank represented generally by the numeral 300. The accumulator tank structure is a machined aluminum block 308 with a hollow center and sealed cap 302. It is surrounded by insulation 312 the block also has heating elements (not shown) to aid in keeping the by-product waste material in a flowable state. An actuator support frame 316 mounted on cap 302 on block 308 supports the actuator 290 used to drive the central shaft 298 that operates to close and open the atmospheric vent seal 320 and the base or drain (not visible), depicted in FIG. 3 as base drain 172. Also shown are the inlet line 296 for by-product waste material and the level sensor housing 294.

Although this preferred design is made from aluminum it should be recognized that the materials of construction are not critical to the instant invention and any number of materials could be used.

In operation the instant invention operates as follows. Referring to FIG. 3, once a SDM build is in progress waste material 58 is generated and flows from the waste reservoir 94 down line 56 by gravity. Inlet port 160 to accumulator 150 is always in an open state, allowing the flow of waste material into the tank. During this filling cycle base drain 172 is in a closed position and atmospheric vent 176 is in an open position. Waste material 166 accumulates in vessel 162 of accumulator 150 until the level of waste material eventually reaches the level of the level sensor 168. When the waste level reaches level detector 168 the sensor transmits a signal (not shown) to actuator 164, which acts to move central shaft 174 downwardly, closing atmospheric top vent 176 and opening base drain 172. With atmospheric top vent 176 sealed the rapid draining of waste material 166 through base drain 172 into waste receptacle 180 creates a negative pressure that effectively pulls waste material 58 from line 56, keeping line 56 clear for the next cycle. After vessel 162 and line 56 are drained, actuator 164 is energized again to move central shaft 174 upwardly, closing base drain 172 and opening atmospheric top vent 176, allowing, gravity flow of further waste material to accumulate in vessel 162 of accumulator 150. Continued operation allows reliable removal of waste material in accurately measured batches and keeps line 56 clear without use of vacuum pumps.

While the invention has been described above with references to specific embodiments thereof, it is apparent that many changes, modifications and variations in the materials, arrangements of parts and steps can be made without departing form the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A material feed and waste system for a solid freeform fabrication apparatus used to from a three-dimensional object, the system comprising:
   means for delivering at least one container to a queue station, the container holding a discrete amount of at least a build material;
   removing said discrete amount of material from said container for delivery to said dispensing device.
   means for delivering at least a build material to at least one dispensing device;
   means for dispensing said discrete amount of material by said dispensing device in a layerwise fashion to form via a plurality of layers a three-dimensional object;
   means for normalizing the layers of the three-dimensional object wherein waste material is produced;
   means for depositing said waste material in a waste receptacle, wherein said means for depositing said waste material comprises:
   a. a waste material line for transporting said waste material to collect said waste material in an intermediate vessel, said intermediate vessel including a sealable bottom drain and a sealable atmospheric vent; and
   b. a level sensor in the intermediate vessel to sense when a pre-set amount of said waste material has been collected in the intermediate vessel in preparation for releasing from said intermediate vessel to said waste receptacle a measured amount of the collected waste material.

2. The apparatus of claim 1 wherein said intermediate vessel further comprises:
   a. an open inlet port connected to the waste material line feeding the intermediate vessel;
   b. an actuator connected to the sealable bottom drain and the sealable atmospheric vent;and
   c. the level sensor activating at a pre-set sensed level the actuator.

3. The apparatus of claim 2 wherein the actuator is movable for simultaneously sealing said sealable bottom drain and opening said sealable atmospheric vent to allow said intermediate vessel to fill through said open inlet port.

4. The apparatus of claim 3 wherein the actuator is movable for simultaneously sealing said sealable atmospheric vent and opening said sealable bottom drain when said level sensor activates at said pre-set level to release said collected waste material to drain from said intermediate vessel to said waste receptacle.

5. The system of claim 1 further comprising means for curing said waste material after said waste material is delivered to said waste receptacle.

6. The system of claim 5 wherein the means for curing said waste material cures said waste material by exposure to actinic radiation or thermal energy.

7. The system of claim 1 further comprises means for delivering at least one container to a queue station, the container holding a discrete amount of at least said build material; and
   means for removing said discrete amount of at least said build material from said container.

8. A solid freeform fabrication apparatus for forming a three-dimensional object in a layerwise fashion by dispensing at least one material, the apparatus comprising:
   a build environment having a build platform for supporting the three-dimensional object while it is being fanned;
   at least one dispensing device adjacent said build platform for dispensing said material to form layers of the three-dimensional object;
   a motion means for respectively moving said dispensing device and said build platform with respect to each other,
   means for normalizing the layers of said dispensed material thereby producing waste material;
   a computer controller for receiving object data descriptive of the three-dimensional object and for processing the data and controlling the apparatus when forming the three-dimensional abject; and
   a material delivery and waste removal means for receiving and delivering said at least one material to said dispensing device and depositing said waste material in a waste receptacle, wherein said waste removal means includes means for depositing said waste material comprising:
   a, a waste material line for transporting said waste material to collect said waste material in an intermediate vessel, said intermediate vessel including a sealable bottom drain and a sealable atmospheric vent; and
   b. a level sensor in the intermediate vessel to sense when a pre-set amount of said waste material has been collected in the intermediate vessel in preparation for releasing from said intermediate vessel to said waste receptacle a measured amount of the collected waste material.

9. The apparatus of claim 8 wherein said intermediate vessel further comprises:
   a. an open inlet port connected to the waste material line feeding the intermediate vessel;
   b. an actuator connected to the sealable bottom drain and the sealable atmospheric vent; and
   c. the level sensor activating at a pre-set sensed level the actuator.

10. The apparatus of claim 9 wherein the actuator is movable for simultaneously sealing said sealable bottom drain and opening said sealable atmospheric vent to allow said intermediate vessel to fill through said inlet port.

11. The apparatus of claim 10 wherein the actuator is movable for simultaneously sealing said sealable atmospheric vent and opening said sealable bottom drain when said level sensor activates at said pre-set level to release said collected waste material to drain from said intermediate vessel to said waste receptacle.

12. The material and waste removal means according to claim 8 further comprising:
   a. means for receiving at least one container, the container holding a discrete amount of said at least one material; and
   b. means for removing said discrete amount of said at least one material from the container.

13. The apparatus of claim 12 further comprising means for ejecting said container when substantially all of the material in the container has been removed.

14. The apparatus of claim 8 further comprising a waste curing means for curing said waste material after said waste material is deposited in said waste receptacle, said waste material being cured by exposure to actinic radiation or thermal energy.

15. The apparatus of claim 8 wherein said dispensing device dispenses a build material to form the three-dimensional object and a support material for forming support for the three-dimensional object.

16. The apparatus of claim 8 having two dispensing devices, one dispensing device dispensing a build material to from the three-dimensional object and the other dispensing device dispensing a support material to form support for the Three-dimensional object.

17. The apparatus of claim 4 further comprising the draining of waste material from the intermediate vessel creating a negative pressure effective to pull residual waste material from the waste material line to drain through the intermediate vessel to the waste receptacle.

18. The apparatus of claim 11 further comprising the draining of waste material from the intermediate vessel creating a negative pressure effective to pull residual waste material from the waste material line to drain through the intermediate vessel to the waste receptacle.

* * * * *